(12) United States Patent
Watabe et al.

(10) Patent No.: US 8,723,662 B2
(45) Date of Patent: May 13, 2014

(54) TIRE PRESSURE DETECTING APPARATUS HAVING WHEEL POSITION DETECTION FUNCTION

(71) Applicant: Denso Corporation, Kariya (JP)

(72) Inventors: Nobuya Watabe, Nagoya (JP); Masashi Mori, Obu (JP); Noriaki Okada, Chiryu (JP); Takatoshi Sekizawa, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/772,878

(22) Filed: Feb. 21, 2013

(65) Prior Publication Data

US 2013/0222128 A1    Aug. 29, 2013

(30) Foreign Application Priority Data

Feb. 23, 2012 (JP) ................................ 2012-037597

(51) Int. Cl.
*B60C 23/00* (2006.01)
*B60C 23/02* (2006.01)
*G01M 17/02* (2006.01)
*B60R 22/00* (2006.01)

(52) U.S. Cl.
USPC ........... 340/447; 340/442; 340/445; 340/444; 116/34 R; 73/146.5; 73/146.2; 73/146; 701/49

(58) Field of Classification Search
None
See application file for complete search history.

(56) References Cited

U.S. PATENT DOCUMENTS

| | | | |
|---|---|---|---|
| 6,018,993 A | 2/2000 | Normann et al. | |
| 6,489,888 B1 | 12/2002 | Honeck et al. | |
| 6,922,140 B2 | 7/2005 | Hernando et al. | |
| 6,941,803 B2 * | 9/2005 | Hirohama et al. | 73/146.5 |
| 6,963,274 B2 * | 11/2005 | Saheki et al. | 340/447 |
| 7,010,968 B2 | 3/2006 | Stewart et al. | |
| 7,253,726 B2 * | 8/2007 | Okubo | 340/447 |
| 7,336,161 B2 | 2/2008 | Walraet | |
| 2011/0071737 A1 | 3/2011 | Greer et al. | |
| 2012/0259507 A1 | 10/2012 | Fink | |

FOREIGN PATENT DOCUMENTS

| | | |
|---|---|---|
| JP | 10-048233 | 2/1998 |
| JP | 2010-122023 | 6/2010 |

\* cited by examiner

*Primary Examiner* — Jennifer Mehmood
*Assistant Examiner* — Pameshanand Mahase
(74) *Attorney, Agent, or Firm* — Harness, Dickey & Pierce, PLC

(57) ABSTRACT

In a tire pressure detecting apparatus, a receiver stores wheel positions detected by a previous wheel position detection as previous wheel positions. When an ignition switch is turned on and until wheel positions are newly specified by a current wheel position detection, the receiver permits an indicator to indicate tire pressure of each of wheels based on the previous wheel positions to notify a driver of the tire pressure from an earlier timing. The receiver permits the indication of the tire pressure based on the previous wheel positions only when a difference of the tire pressure between the wheels is equal to or less than a threshold. If there is a possibility that tire pressure of one of the wheels is insufficient, the receiver prevents the indicator to indicate the tire pressure until a current wheel position detection finishes.

4 Claims, 10 Drawing Sheets

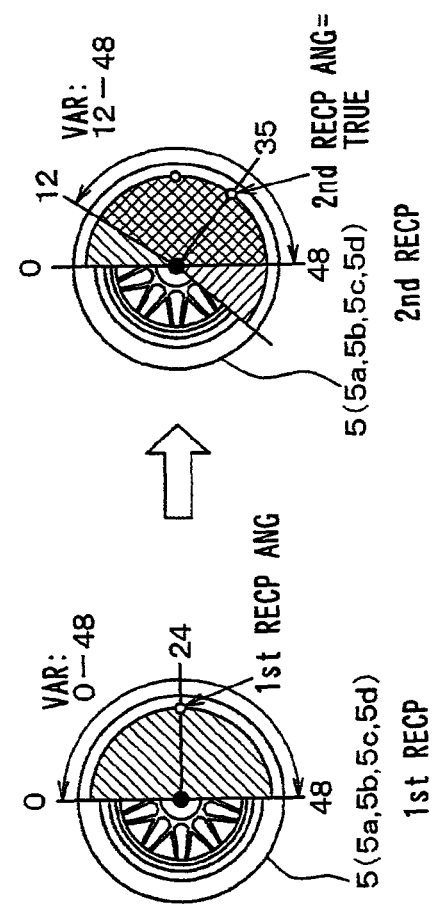

| RECP | TIME (t) | TOOTH POSITION AT RECEPTION TIMING (0-95) | | | | WHEEL POSITION SPECIFYING LOGIC (TRUE OR FALSE) | | | |
|---|---|---|---|---|---|---|---|---|---|
| | | FL | FR | RL | RR | FL | FR | RL | RR |
| 1 | 0.0 | 68 | 92 | 62 | 78 | — | — | — | — |
| 2 | 5.1 | 56 | 42 | 38 | 8 | TRUE | FALSE | TRUE | FALSE |
| 3 | 10.3 | 72 | 26 | 42 | 72 | TRUE | | TRUE | |
| 4 | 14.3 | 60 | 62 | 22 | 6 | TRUE | | FALSE | |

| REC | TIME (t) | TOOTH POSITION AT RECEPTION TIMING (0-95) | | | | WHEEL POSITION SPECIFYING LOGIC (TRUE OR FALSE) | | | |
|---|---|---|---|---|---|---|---|---|---|
| | | FL | FR | RL | RR | FL | FR | RL | RR |
| 1 | 0.0 | 38 | 68 | 30 | 50 | — | — | — | — |
| 2 | 4.1 | 2 | 78 | 80 | 46 | FALSE | TRUE | FALSE | TRUE |
| 3 | 8.3 | 42 | 74 | 14 | 28 | | TRUE | | TRUE |
| 4 | 12.4 | 88 | 78 | 52 | 22 | | TRUE | | FALSE |

| REC | TIME (t) | TOOTH POSITION AT RECEPTION TIMING (0-95) | | | | WHEEL POSITION SPECIFYING LOGIC (TRUE OR FALSE) | | | |
|---|---|---|---|---|---|---|---|---|---|
| | | FL | FR | RL | RR | FL | FR | RL | RR |
| 1 | 0.0 | 62 | 94 | 54 | 76 | — | — | — | — |
| 2 | 4.5 | 80 | 66 | 60 | 32 | TRUE | FALSE | TRUE | FALSE |
| 3 | 9.0 | 92 | 40 | 64 | 88 | FALSE | | TRUE | |

| REC | TIME (t) | TOOTH POSITION AT RECEPTION TIMING (0-95) | | | | WHEEL POSITION SPECIFYING LOGIC (TRUE OR FALSE) | | | |
|---|---|---|---|---|---|---|---|---|---|
| | | FL | FR | RL | RR | FL | FR | RL | RR |
| 1 | 0.0 | 36 | 86 | 24 | 62 | — | — | — | — |
| 2 | 4.5 | 0 | 6 | 74 | 64 | FALSE | TRUE | FALSE | TRUE |
| 3 | 8.6 | 62 | 24 | 30 | 70 | | FALSE | | TRUE |

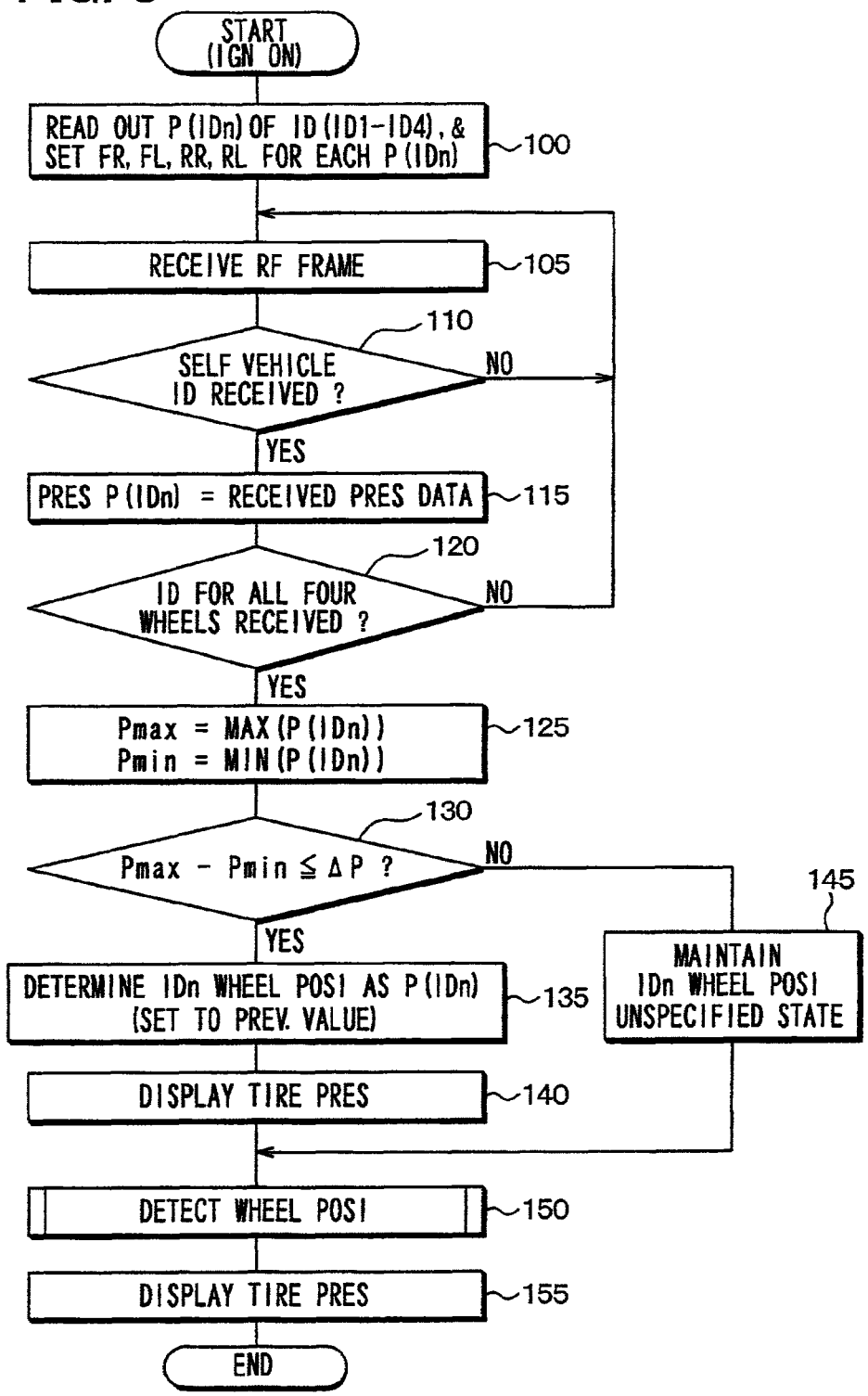

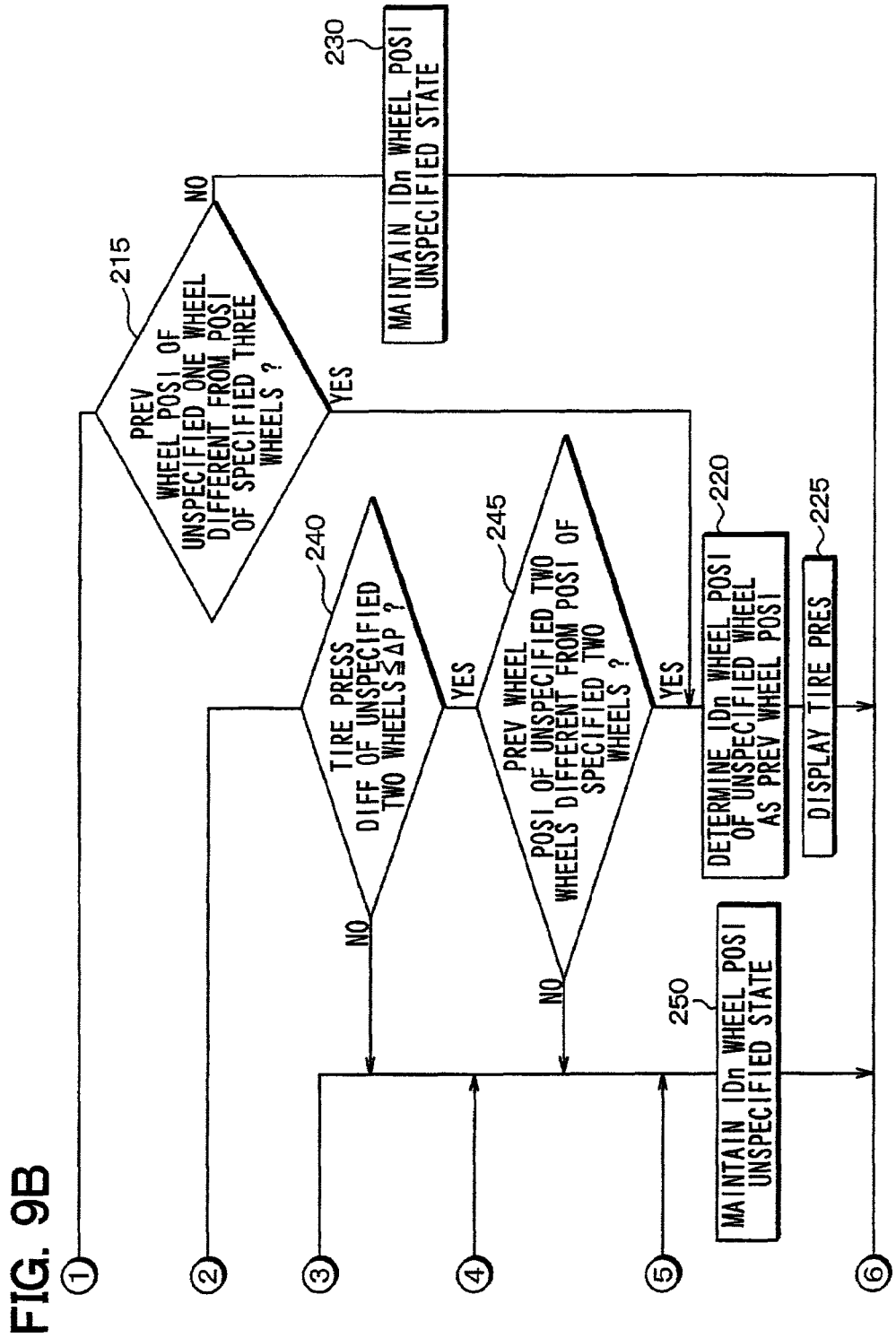

TIRE PRESSURE DETECTING APPARATUS HAVING WHEEL POSITION DETECTION FUNCTION

CROSS REFERENCE TO RELATED APPLICATION

This application is based on Japanese Patent Application No. 2012-37597 filed on Feb. 23, 2012, the disclosure of which is incorporated herein by reference.

TECHNICAL FIELD

The present disclosure relates to a tire pressure detecting apparatus having a wheel position detection function that automatically detects a position of a subject wheel in a vehicle. More particularly, the present disclosure relates to a direct-type tire pressure detecting apparatus that detects a tire pressure based on a detection result of a pressure sensor of a transmitter that is directly integrated to a wheel.

BACKGROUND

As an example of the tire pressure detecting apparatus, a direct-type tire pressure detecting apparatus has been known. In the direct-type tire pressure detecting apparatus, a transmitter is directly fixed to each of wheels equipped with a tire. The transmitter is provided with a sensor, such as a pressure sensor. A vehicle body is equipped with an antenna and a receiver. When the transmitter transmits a detection signal of the sensor, the receiver receives the detection signal through the antenna, and detects the tire pressure of the wheel based on the detection signal.

In such a direct-type tire pressure detecting apparatus, data transmitted from the transmitter includes individual identification (ID) information for identifying whether the transmitted data is associated with a subject vehicle to which the tire pressure detecting apparatus is equipped, and for identifying which wheel the transmitter transmitting the data is fixed to.

To specify the position of the transmitter based on the ID information of the transmitted data, the receiver needs to store beforehand a relationship between the ID information of each transmitter and the position of a corresponding wheel, as a wheel position relationship. When the positions of the wheels are changed by a tire rotation, it is necessary to register the wheel position relationship again.

As a method for automatically registering the wheel position relationship, an initiator method and a zero initiator method are generally known. In the initiator method, initiator (trigger device) is used to permit the transmitter to transmit a frame at a predetermined timing. Although the wheel position can be detected at an early stage by means of an interactive communication, the initiator is necessary. In the zero initiator method, on the other hand, the initiator is not necessary. For example, a wheel position detection by the zero initiator method is described in patent literatures 1-4.

PATENT LITERATURES

Patent literature 1: U.S. Pat. No. 7,010,968B2
Patent literature 2: U.S. Pat. No. 6,018,993
Patent literature 3: U.S. Pat. No. 6,489,888B1
Patent literature 4: JP2010-122023A For example, in the patent literature 1, a transmitter is equipped with a dual-axis accelerometer, and a receiver measures a signal strength when receiving a frame transmitted from the transmitter. Further, it is determined whether the transmitter is integrated to a right wheel or a left wheel based on a detection signal of the accelerometer, and it is determined whether the transmitter is integrated to a front wheel or a rear wheel based on the signal strength when the frame is received at the receiver.

In the patent literature 2, an RF antenna is disposed adjacent to each of the wheels. The transmitter transmitting the frame that indicates the highest signal intensity among the frames received is determined as the transmitter integrated to the wheel closest to the RF antenna.

In a method described in the patent literature 3, a wheel position is detected based on distribution of a received signal strength indicator (RSSI) value of a signal transmitted from the transmitter integrated to each of the wheels.

In the patent literature 4, a rotational position of each wheel is detected based on an acceleration detection signal of an acceleration sensor of a transmitter integrated to the wheel. Also, a rotational position of each wheel is detected in a vehicle body when a radio signal is transmitted from the transmitter. The wheel position is specified by monitoring a change in a relative angle between the rotational position detected by the transmitter and the rotational position of the wheel detected in the vehicle body.

Namely, the change of the relative angle between the rotational position of the wheel detected in the wheel and the rotational position of the wheel detected in the vehicle body is monitored based on a deviation of predetermined number of data. The position of the wheel is specified by determining whether a variation of the change of the relative angle relative to an initial value is over an acceptable value.

In particular, a wheel speed sensor is provided for each of the wheels. A tooth number of a gear (rotor) is calculated based on a wheel speed pulse outputted from the wheel speed sensor. The wheel position is specified based on a relative angle between the rotational position detected by the transmitter based on the acceleration detection signal of the acceleration sensor and a rotational angle indicated by the tooth number of the gear calculated from the wheel speed pulse.

SUMMARY

In a zero initiator method as described in the patent literatures 1-4, a predetermined traveling time is required to obtain a detection result of the wheel position and to indicate the detection result to notify a driver. Therefore, a tire pressure is not notified to the driver for a while after a vehicle begins to travel.

It is an object of the present disclosure to provide a tire pressure detecting apparatus capable of notifying a driver of a tire pressure from an earlier timing.

According to an aspect of the present disclosure, a tire pressure detecting apparatus includes a transmitter integrated to each of wheels of a vehicle, and a receiver integrated to a body of the vehicle. The transmitter includes a first control unit. The first control unit generates tire pressure information regarding a tire pressure of the corresponding wheel. The first control unit generates and transmits a frame including identification information specific to the transmitter and the tire pressure information. The receiver includes a second control unit. The second control unit receives the frame transmitted from the transmitter through an antenna. The second control unit performs a wheel position detection to specify a wheel position indicating to which of the wheels the transmitter transmitting the frame is integrated to and to store a relationship between the wheel position specified and the identification information of the transmitter, as wheel position relationship. The second control unit permits an indicator to indicate tire pressure indicated by the tire pressure information stored in the frame while specifying a position of the wheel, based on the wheel position relationship stored in the wheel position detection. Further, until a current wheel position detection finishes, when a difference of tire pressure between the wheels indicated by the tire pressure information stored in the frames is equal to or less than a threshold, the second control unit permits the indicator to indicate the tire pressure based on a previous wheel position, as a provisional wheel position, that is provided by a previous wheel position relationship stored in a previous wheel position detection.

In the tire pressure detecting apparatus according to the above aspect, the second control unit stores the result of the previous wheel position detection as the previous wheel position. The second control unit controls the indicator to indicate the tire pressure based on the previous wheel position, until the result of the current wheel position detection is obtained. Therefore, the tire pressure can be notified to a driver from an earlier timing when the vehicle begins to travel. Further, the second control unit performs the indication of the tire pressure based on the previous wheel position only when the difference of the tire pressure is equal to or less than the threshold. Therefore, if there is a possibility that the tire pressure of a certain wheel is insufficient, the second control unit prevents the indicator to indicate the tire pressure until the current wheel position detection finishes. Accordingly, it is less likely that the driver will erroneously recognize the wheel having the insufficient tire pressure.

BRIEF DESCRIPTION OF THE DRAWINGS

The above and other objects, features and advantages of the present disclosure will become more apparent from the following detailed description made with reference to the accompanying drawings, in which like parts are designated by like reference numbers and in which:

FIGS. 5A to 5C are schematic diagrams for explaining a wheel position specifying logic performed by the wheel position detection function according to the first embodiment;

FIGS. 6A-6D are diagrams illustrating a wheel position evaluation result by the wheel position detection function according to the first embodiment;

FIG. 8 is a flow chart illustrating a process of wheel position detection and tire pressure display according to the first embodiment; and FIGS. 9A and 9B are flowcharts illustrating a process of wheel position detection and tire pressure display performed by a tire pressure detecting apparatus according to a second embodiment of the present disclosure.

DETAILED DESCRIPTION

Figure 1:
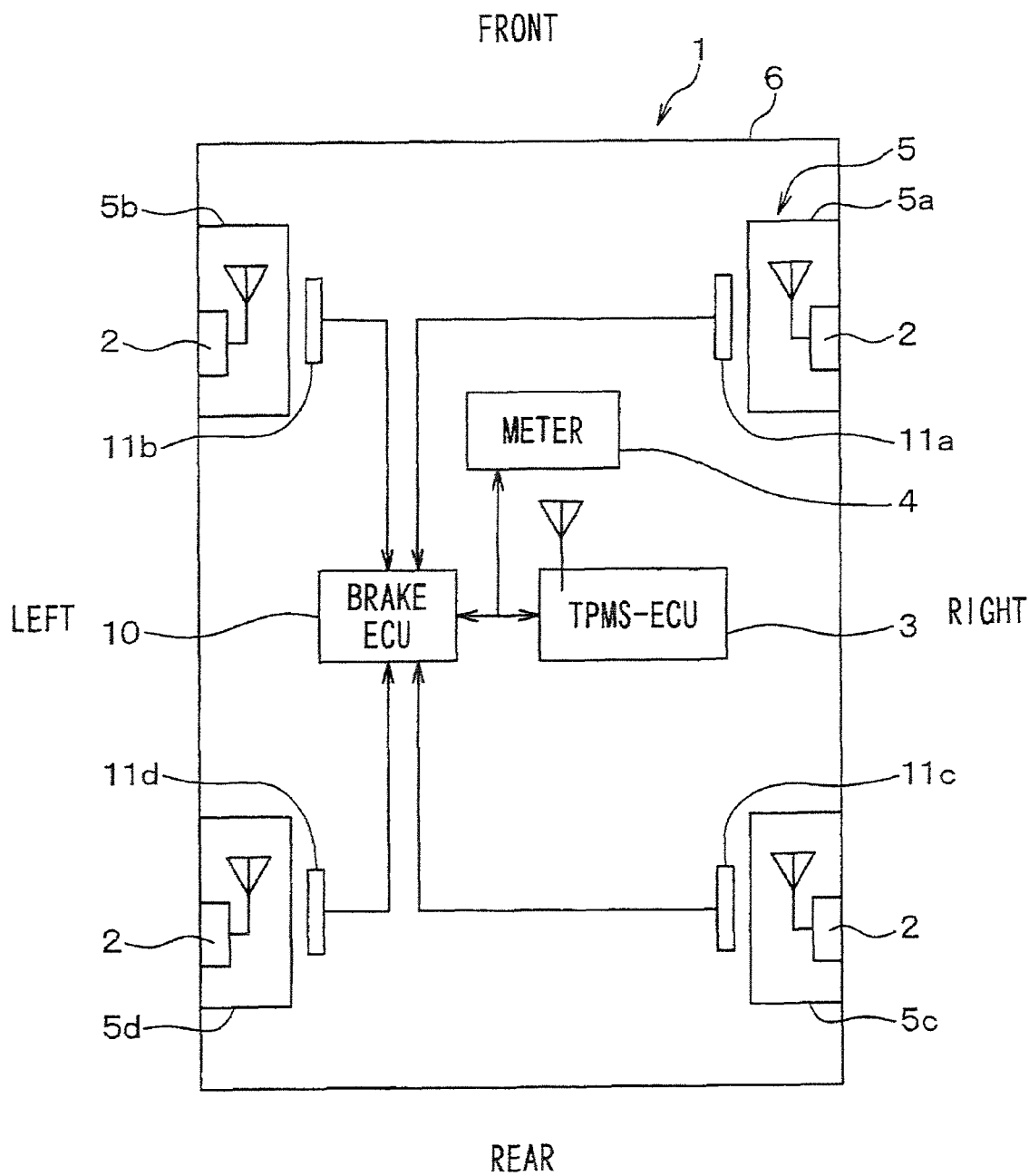
FIG. 1 is a schematic diagram for illustrating an overall structure of a tire pressure detecting apparatus having a wheel position detection function according to a first embodiment of the present disclosure.

Hereinafter, embodiments of the present disclosure will be described with reference to the drawings. Like parts will be designated with like reference numerals throughout the embodiments.

First Embodiment

A first embodiment will be described with reference to FIGS. 1 to 8.

FIG. 1 is a schematic diagram illustrating an overall structure of a tire pressure detecting apparatus with a wheel position detection function in a vehicle 1. In FIG. 1, an upward direction corresponds to a frontward direction of the vehicle 1, and a downward direction corresponds to a rearward direction of the vehicle 1. The tire pressure detecting apparatus according to the present embodiment will be described with reference to FIG. 1.

The tire pressure detecting apparatus is equipped to the vehicle 1. The tire pressure detecting apparatus includes a transmitter 2, a tire pressure monitoring system electronic control unit (hereinafter referred to as the TPMS-ECU) 3, and a meter 4. The TPMS-ECU 3 serves as a receiver.

The tire pressure detecting apparatus has a wheel position detection function. The tire pressure detecting apparatus specifies a position of each wheel 5 (5a-5d) by acquiring gear information from a brake electronic control unit (hereinafter referred to as the brake ECU) 10 while using the transmitter 2 and the TPMS-ECU 3. The gear information is obtained based on a detection signal of each of wheel speed sensors 11a-11d, which are provided for the wheels 5a-5d, respectively.

The transmitter 2 is integrated to each of the wheels 5a-5d. The transmitter 2 detects a tire pressure, such as a tire air pressure, of the corresponding wheel 5a-5d. The transmitter 2 stores a detection result of the tire pressure, as tire pressure information regarding a tire pressure, in a frame and transmits the frame.

The TPMS-ECU 3 is integrated to a body 6 of the vehicle 1. The TPMS-ECU 3 receives the frame transmitted from the transmitter 2. Further, the TPMS-ECU 3 performs wheel position detection and tire pressure detection by executing various processes and computations based on data stored in the frame.

Figure 2A:
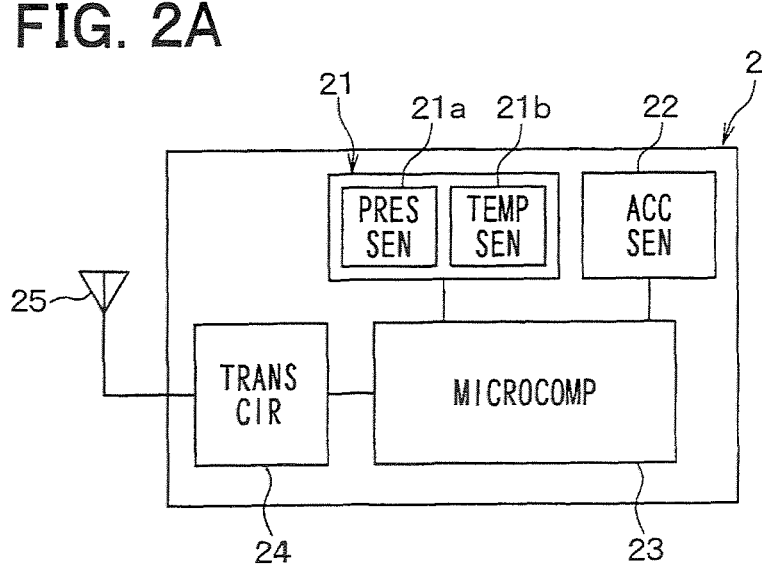
FIG. 2A is a schematic block diagram of a transmitter of the tire pressure detecting apparatus according to the first embodiment.
Figure 2B:
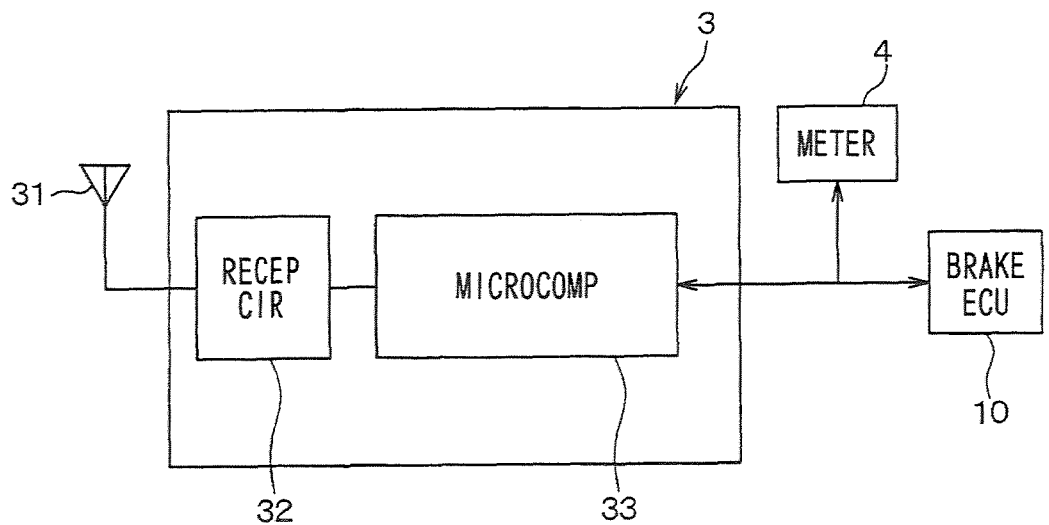
FIG. 2B is a schematic block diagram of a receiver of the tire pressure detecting apparatus according to the first embodiment.

For example, the transmitter 2 generates the frame by a frequency shift keying (FSK). The TPMS-ECU 3 demodulates the frame to read data in the frame, and performs the wheel position detection and the tire pressure detection based on the data read. FIG. 2A is a schematic block diagram of the transmitter 2, and FIG. 2B is a schematic block diagram of the TPMS-ECU 3.

As shown in FIG. 2A, the transmitter 2 includes a sensing unit 21, an acceleration sensor 22, a microcomputer 23, a transmission circuit 24 and a transmitting antenna 25. The sensing unit 21, the acceleration sensor 22, the microcomputer 23, the transmission circuit 24 and the transmitting antenna 25 are driven by electric power supplied from a battery (not shown).

The sensing unit 21 includes a pressure sensor 21a and a temperature sensor 21b. The pressure sensor 21a is, for example, a diaphragm-type pressure sensor. The sensing unit 21 outputs a detection signal according to the tire pressure, and a detection signal according to a temperature.

The acceleration sensor 22 is used for detecting its position within the corresponding wheel 5a-5d to which the transmitter 2 is integrated. That is, the acceleration sensor 22 is used for detecting a position of the transmitter 2. Also, the acceleration sensor 22 is used for detecting a vehicle speed. The acceleration sensor 22 outputs a detection signal according to accelerations in both radial directions of the corresponding wheel 5a-5d, that is, accelerations in both directions perpendicular to a circumferential direction of the corresponding wheel 5a-5d.

The microcomputer 23 may be a well-known type microcomputer. The microcomputer 23 includes a control unit (first control unit) and the like. The microcomputer 23 performs a predetermined process in accordance with a program stored in a memory of the control unit. The memory of the control unit has individual ID information including transmitter identification information and vehicle identification information. The transmitter identification information is specific to each subject transmitter 2 for identifying the transmitter 2. The vehicle identification information is specific to the subject vehicle 1 to identify the subject vehicle 1.

The microcomputer 23 receives the detection signal indicating the tire pressure from the sensing unit 21, and processes the detection signal to generate the tire pressure information. Further, the microcomputer 23 stores the tire pressure information as well as the ID information of the subject transmitter 2 in the frame.

Also, the microcomputer 23 monitors the detection signal from the acceleration sensor 22. The microcomputer 23 detects the position of the subject transmitter 2 within the corresponding wheel 5a-5d, and detects the vehicle speed based on the detection signal from the acceleration sensor 22.

When the microcomputer 23 generates the frame, the microcomputer 23 transmits the frame (data) toward the TPMS-ECU 3 through the transmission circuit 24 and the transmission antenna 25, based on detection results of the position of the subject transmitter 2 and the vehicle speed.

In particular, the microcomputer 23 begins to transmit the frame when the vehicle 1 is traveling. Further, the microcomputer 23 transmits the frame each time the acceleration sensor 22 is at a predetermined angular position relative to a reference position, based on the detection signal of the acceleration sensor 22. The microcomputer 23 determines whether the vehicle 1 is traveling, based on the detection result of the vehicle speed. Also, the microcomputer 23 determines the angular position of the acceleration sensor 22 based on the detection result of the position of the transmitter 2, which is obtained based on the detection signal of the acceleration sensor 22.

Namely, the microcomputer 23 detects the vehicle speed using the detection signal of the acceleration sensor 22, and determines that the vehicle 1 is traveling when the vehicle speed is equal to or greater than a predetermined speed, such as 5 km/h or more. The output of the acceleration sensor 22 contains an acceleration (centrifugal acceleration) based on a centrifugal force. The vehicle speed is calculated by integrating the centrifugal accelerations and multiplying a coefficient. Therefore, the microcomputer 23 calculates the centrifugal acceleration by removing a gravitational acceleration component from the output of the acceleration sensor 22, and calculates the vehicle speed based on the calculated centrifugal acceleration.

The acceleration sensor 22 outputs the detection signal according to rotation of the corresponding wheel 5a-5d. Therefore, when the vehicle 1 is traveling, the detection signal of the acceleration sensor 22 contains the gravitational acceleration component. As such, the detection signal has an amplitude according to the rotation of the corresponding wheel 5a-5d.

For example, the amplitude of the detection signal has a maximum negative value when the transmitter 2 is located right above a center axis of the corresponding wheel 5a-5d (wheel center axis), and has a maximum positive value when the transmitter 2 is located right under the wheel center axis. Further, the amplitude of the detection signal has a value of zero when the transmitter 2 is at the same level as the wheel center axis.

Therefore, the angular position of the acceleration sensor 22 can be detected based on the amplitude. For example, a position right above the wheel center axis is defined as reference position, such as a zero degree position. The angular position of the acceleration sensor 22 is defined relative to the reference position. The reference position may be any position on a circumferential direction of the wheel 5a-5d.

The transmitter 2 begins to transmit the frame when the vehicle speed reaches a predetermined speed or when the acceleration sensor 22 is at the predetermined angular position after the vehicle speed reaches the predetermined speed. Further, the transmitter 2 may transmit the frame each time the acceleration sensor 22 reaches the angular position same as the angular position when the frame is transmitted first time, as a transmission timing. Namely, the transmitter 2 repeatedly transmits the frame.

With regard to the transmission timing, the frame may be transmitted each time the acceleration sensor 22 reaches the angular position same as the angular position when the frame is transmitted first time. However, it may not be always necessary to transmit the frame each time the acceleration sensor 22 reaches the same angular position. Considering a battery life, the transmitter 2 may transmit the frame at a predetermined interval, such as every 15 seconds.

The transmission circuit 24 serves as an output unit that receives the frame provided from the microcomputer 23 and transmits the frame toward the TPMS-ECU 3 through the transmission antenna 25. For example, the frame is transmitted through an RF band radio wave.

The transmitter 2 is, for example, fixed to an air injection valve of each wheel 5a-5d such that the sensing unit 21 exposes inside of the tire. The pressure sensor 21a of the transmitter 2 detects the tire pressure. As described above, when the vehicle speed exceeds the predetermined speed, the transmitter 2 transmits the frame through the transmission antenna 25 each time the acceleration sensor 22 is at the predetermined angular position.

Thereafter, it may be possible that the transmitter 2 continuously transmits the frame each time the acceleration sensor 22 is at the predetermined angular position. However, considering the battery life, it is preferable to increase a transmission interval. Therefore, when a predetermined time period necessary for specifying the wheel position has elapsed, the transmitter 2 may be switched from a wheel position detection mode to a regular transmission mode.

In the regular transmission mode, the transmitter 2 regularly transmits the frame toward the TPMS-ECU 3 at a constant interval, such as every one minute, which is longer than the transmission interval in the wheel position specifying mode. In this case, for example, it may be possible to differentiate the transmission timing of the frame between the transmitters 2 by setting a random delay for each transmitter 2. In such a case, interference of the radio waves from the plural transmitters 2 will be reduced, so that the frames will be properly received by the TPMS-ECU 3.

As shown in FIG. 2B, the TPMS-ECU 3 includes a reception antenna 31, a reception circuit 32, and a microcomputer 33. The TPMS-ECU 3 acquires the gear information from the brake ECU 10 through an in-vehicle local area network (LAN), such as a controller area network (CAN).

In the vehicle 1, gears 12a-12d are disposed to rotate in association with the wheels 5a-5d, respectively. The TPMS-ECU 3 obtains a tooth position of each gear 12a-12d, which is represented by an edge number or a tooth number, based on the gear information.

The reception antenna 31 is provided to receive the frame transmitted from each transmitter 2. The reception antenna 31 is fixed to the vehicle body 6. The reception antenna 31 may be an internal antenna disposed inside of a body of the TPMS-ECU 3. Alternatively, the reception antenna 31 may be an external antenna disposed outside of the body of the TPMS-ECU 3 and connected to the body of the TPMS-ECU 3 through a wire.

The reception circuit 32 serves as an input section that receives the frame transmitted from each transmitter 2 through the reception antenna 31, and sends the frame to the microcomputer 33. Namely, when the reception circuit 32 receives a signal (frame) through the reception antenna 31, the reception circuit 32 transmits the received signal to the microcomputer 33.

The microcomputer 33 corresponds to a second control unit. The microcomputer 33 performs the wheel position detection in accordance with a program stored in a memory of the microcomputer 33. In particular, the microcomputer 33 performs the wheel position detection based on a relationship between information acquired from the brake ECU 10 and a reception timing receiving the frame transmitted from each transmitter 2. The microcomputer 33 acquires the gear information, in addition to wheel speed information of each of the wheels 5a-5d, from the brake ECU 10 at a predetermined time interval, such as every 10 milliseconds.

The gear information indicates the tooth position of each gear 12a-12d rotating in association with the corresponding wheel 5a-5d. The tooth position of the gear 12a-12d is detected using the wheel speed sensor 11a-11d disposed to correspond to the gear 12a-12d.

For example, the wheel speed sensor 11a-11d is provided by an electromagnetic pick-up sensor disposed to oppose teeth of the corresponding gear 12a-12d. A detection signal outputted from the wheel speed sensor 11a-11d changes in accordance with passage of the teeth of the gear 12a-12d. The wheel speed sensor 11a-11d outputs a rectangular pulse wave corresponding to the teeth, as the detection signal. Rising edges and falling edges of the rectangular pulse wave indicate the passage of edges of the teeth of the gear 12a-12d.

The brake ECU 10 detects the edge number, that is, counts the number of edges being passed through the wheel speed sensor 11a-11d based on the number of rising edges and falling edges of the detection signal of the wheel speed sensor 11a-11d. The brake ECU 10 provides a current edge number to the microcomputer 33 at a predetermined interval, as the gear information. Therefore, the microcomputer 33 can determine which tooth of the gear 12a-12d passes through the wheel speed sensor 11a-11d at a timing.

The edge number is reset each time the gear 12a-12d rotates one revolution. For example, in a case of gear having 48 teeth, the number of edges is 96. In this case, the edge number is counted from 0 to 95. When the edge number counted reaches 95, the edge number returns to 0, and is counted again from zero.

In the example described above, the edge number is provided from the brake ECU 10 to the microcomputer 33 as the gear information. As another example, a tooth number, that is, the number of teeth counted may be provided from the brake ECU 10 to the microcomputer 33 as the gear information. As further another example, the number of edges or the number of teeth, which has passed through the wheel speed sensor 11a-11d in a predetermined period, may be provided to the microcomputer 33, and the microcomputer 33 may add the number of edges or the number of teeth provided to a previous edge number or tooth number, to detect the edge number or the tooth number. That is, a way of detecting the edge number or the tooth number may not be limited to a specific way as long as the microcomputer 33 ultimately obtains the edge number or the tooth number as the gear information.

The brake ECU 10 resets the edge number (or the tooth number) when the power supply is turned off. The brake ECU 10 begins to count the edge number (or the tooth number) again when the power supply is turned on or when the vehicle speed reaches the predetermined speed after the power supply is turned on. In this way, even if the edge number (or the tooth number) is reset every time the power supply is turned off, the same tooth is indicated with the same edge number (or the same tooth number) during the electric power being off.

When the microcomputer 33 receives the frame transmitted from each transmitter 2, the microcomputer 33 measures the reception timing of the frame, and performs the wheel position detection based on the edge number (or the tooth number) at the reception timing of the frame among the edge numbers (or the tooth numbers) acquired. Therefore, the wheel position detection to specify which of the wheels 5a-5d each transmitter 2 is integrated to can be performed. The wheel position detection will be described later more in detail.

The microcomputer 33 stores a relationship between the ID information of each transmitter 2 and the position of each wheel 5a-5d to which the transmitter 2 is integrated, as a wheel position relationship, based on the result of the wheel position detection. Thereafter, the microcomputer 33 detects the tire pressure of each wheel 5a-5d based on the ID information and the tire pressure information, which are stored in the frame transmitted from each transmitter 2. Further, the microcomputer 33 outputs an electric signal according to the tire pressure to the meter 4 through the in-vehicle LAN, such as the CAN.

For example, the microcomputer 33 detects a decrease in tire pressure by comparing the detected tire pressure to a predetermined threshold. When the microcomputer 33 detects the decrease in tire pressure, the microcomputer 33 outputs a signal indicating the decrease in tire pressure to the meter 4. Namely, the microcomputer 33 can notify the meter 4 of the decrease of the tire pressure of any of the wheels 5a-5d.

The meter 4 serves as an indicator. As shown in FIG. 1, the meter 4 is disposed at a position which can be seen by a driver. For example, the meter 4 is provided by a meter display and the like disposed within an instrument panel of the vehicle 1. For example, when the meter 4 receives the signal regarding the tire pressure from the microcomputer 33 of the TPMS-ECU 3, the meter 4 displays the tire pressure while specifying the wheel 5a-5d. Namely, the meter 4 notifies the driver of the tire pressure of each wheel 5a-5d.

Next, an operation of the tire pressure detecting apparatus will be described. In the following description, the wheel position detection and the tire pressure detection, which are performed by the tire pressure detecting apparatus, will be explained separately.

Figure 3:
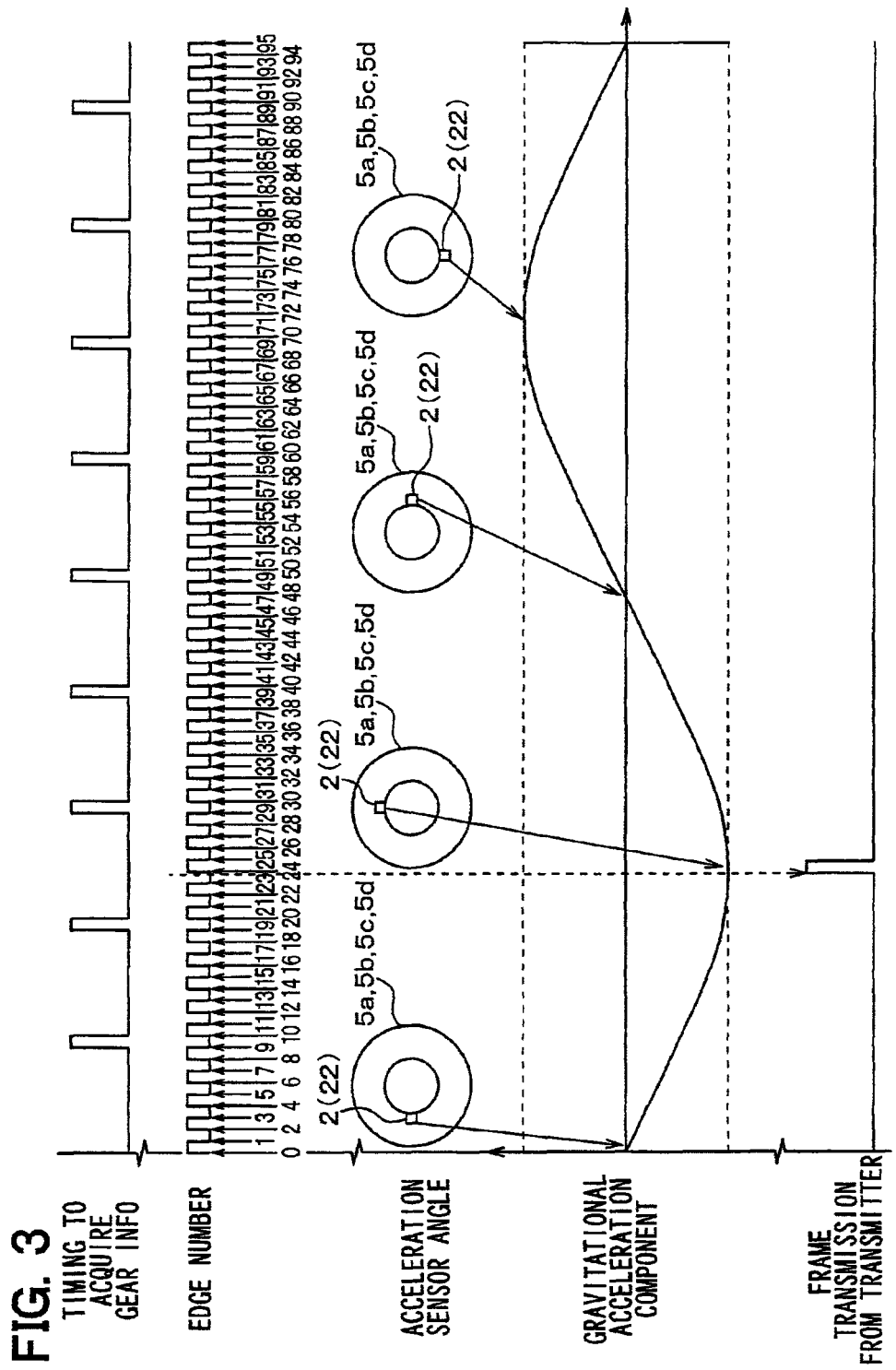
FIG. 3 is a time chart for explaining a wheel position detection performed by the wheel position detection function according to the first embodiment.

First, the wheel position detection will be described. FIG. 3 is a time chart for explaining the wheel position detection.

Figure 4:
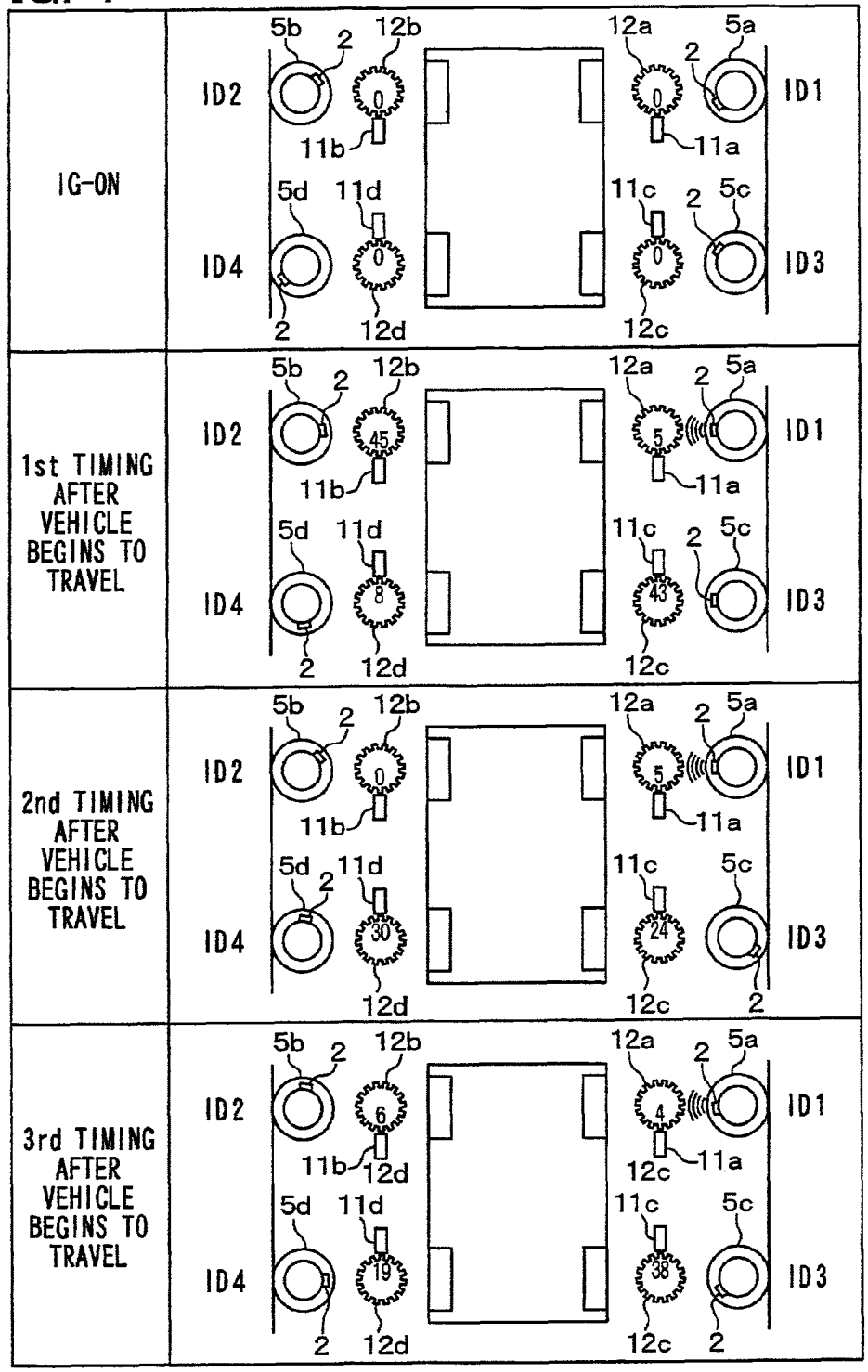
FIG. 4 is a schematic diagram for illustrating a change of gear information according to the first embodiment.

FIG. 4 is a diagram illustrating an image of a change of the gear information after an ignition switch is turned on and the vehicle 1 begins to travel. For example, FIG. 4 illustrates the gear information at each timing, such as when the ignition switch is turned on and at first to third timings after the vehicle 1 begins to travel. FIGS. 5A to 5C are schematic diagrams for explaining a wheel position specifying logic. FIGS. 6A to 6D are diagrams illustrating wheel position evaluation results of the frames transmitted from the transmitters 2. The method of the wheel position detection will be described in detail with reference to FIGS. 3 to 6D.

In the transmitter 2, the microcomputer 23 is supplied with electric power from the battery. The microcomputer 23 monitors the detection signal of the acceleration sensor 22 at a predetermined sampling interval to detect the vehicle speed and the angular position of the acceleration sensor 22 within the corresponding wheel 5a-5d.

After the vehicle speed reaches a predetermined speed, the microcomputer 23 transmits the frame each time the acceleration sensor 22 is at a predetermined angular position. For example, the transmitter 2 beings to transmit the frame when the vehicle speed reaches the predetermined speed, or when the acceleration sensor 22 reaches a predetermined angular position after the vehicle speed reaches the predetermined speed. Thereafter, the transmitter 2 transmits the frame each time the acceleration sensor 22 is at the angular position same as the angular position when the frame is transmitted first time, as a transmission angular position.

The gravitational acceleration component of the detection signal outputted from the acceleration sensor 22 has a sine curve, as shown in FIG. 3. The angular position of the acceleration sensor 22 is detected based on the sine curve. Therefore, the frame is transmitted each time the acceleration sensor 22 reaches the same angular position based on the sine curve.

The TPMS-ECU 3 acquires the gear information of the wheel speed sensor 11a-11d provided in association with the corresponding wheel 5a-5d, at a predetermined interval, such as every 10 milliseconds, from the brake ECU 10. The TPMS-ECU 3 measures the reception timing of the frame transmitted from each transmitter 2, and detects the edge number (or the tooth number) of the gears 12a-12d at the reception timing of the frame among the edge numbers (or the tooth numbers) acquired.

In this case, it is not always true that the reception timing of the frame transmitted from each transmitter 2 and the timing of acquiring the gear information from the brake ECU 10 coincide with each other. For example, the edge number (or the tooth number) of the gear information acquired at a timing that is the closest to the reception timing of the frame, that is, the edge number (or the tooth number) of the gear information acquired at a timing immediately before or immediately after the reception timing of the frame may be used as the edge number (or the tooth number) at the reception timing of the frame.

As another example, the edge number (or the tooth number) at the reception timing of the frame may be calculated using the edge number (or the tooth number) indicated by the gear information acquired at the timing immediately before or immediately after the reception timing of the frame. For example, an intermediate number between the edge number (or the tooth number) of the gear information acquired at the timing immediately before the reception timing of the frame and the edge number (or the tooth number) of the gear information acquired at the timing immediately after the reception timing of the frame may be used as the edge number (or the tooth number) of the reception timing of the frame.

The TPMS-ECU 3 obtains the edge number (or the tooth number) at the reception timing of the frame each time the TPMS-ECU 3 receives the frame. The TPMS-ECU 3 performs the wheel position detection based on the obtained edge number (or tooth number) at the reception timing of the frame. In particular, the wheel position is detected by determining whether variation of the obtained edge number (or tooth number) at the reception timing of the frame is within a predetermined range that is set based on the edge number (or the tooth number) at the previous reception timing.

In regard to a wheel 5a-5d to which a subject transmitter 2 transmitting the frame is integrated, the subject transmitter 2 transmits the frame each time the acceleration sensor 22 is at the predetermined angular position. Therefore, the tooth position of the gear 12a-12d corresponding to the wheel 5a-5d at the reception timing of the frame is substantially the same as the tooth position at the previous reception timing. As such, the variation of the edge number (or the tooth number) at the reception timing of the frame is small, and is within a predetermined range. Even if the frames are received at many times, the tooth positions at the reception timings of the frame are substantially the same, that is, within a predetermined range. The variation of the edge number (or the tooth number) at each reception timing of the frame is within a predetermined range set based on the edge number (or the tooth number) at the first reception timing of the frame.

On the other hand, in regard to different wheels 5a-5d to which the subject transmitter 2 is not integrated, the tooth positions at the reception timing of the frame transmitted from the subject transmitter 2 are different from the tooth position at the reception timing of the frame transmitted from the subject transmitter 2.

Namely, the gear 12a-12d of the wheel speed sensor 11a-11d rotates in association with the corresponding wheel 5a-5d. Therefore, with regard to the wheel 5a-5d to which the subject transmitter 2 is integrated, the tooth position at the reception timing of the frame transmitted from the subject transmitter 2 is substantially equal. In fact, however, the wheels 5a-5d have different rotating states due to a road condition, a turning, a lane changing and the like. Therefore, the rotating states of the wheels 5a-5d are not exactly the same. As such, with regard to the wheels to which the subject transmitter 2 is not integrated, the tooth positions indicated by the edge numbers (or the tooth numbers) at the reception timing are varied.

As shown in FIG. 4, the edge number of each of gears 12a-12d is zero when the ignition switch (IG) is turned on, for example. After the vehicle begins to travel, the transmitters 2 transmit the frames. In this case, at the reception timing of the frame transmitted from the subject transmitter 2 integrated to the wheel, such as the wheel 5a, the tooth positions of the gears 12b-12d rotating in association with the wheels 5b-5d are varied from the tooth position of the gear 12a rotating in association with the wheel 5a, as shown in the first through third timings in FIG. 4. Therefore, the wheel position is detected by determining whether the variation of the tooth position of the gear 12a-12d is within a predetermined range.

For example, as shown in FIG. 5A, it is assumed that the angular position of the subject transmitter 2 when the subject transmitter 2 transmits the frame first time is at a first reception angle. In this case, a variation allowance range VAR, which is an allowable range of the variation of the edge number (or the tooth number), is set at a range of 180 degrees centering on the first reception angle, that is, as a range of +/−90 degrees of the first reception angle. For example, the variation allowance range VAR set based on the edge number (or the tooth number) at the first reception timing is referred to as a first variation allowance range.

In regard to the edge number, the first variation allowance range VAR is set at a range of +/−24 of the edge number at the first reception timing. In regard to the tooth number, the first variation allowance range VAR is set at a range of +/−12 of the tooth number at the first reception timing.

Then, as shown in FIG. 5B, it is determined whether the edge number (or the tooth number) at the second reception timing of the frame is within the first variation allowance range VAR set by the edge number (or the tooth number) at the first reception timing of the frame. At the second reception timing of the frame, if the edge number (or the tooth number) of the gear 12a-12d is within the first variation allowance range VAR, there is a possibility that the wheel 5a-5d corresponding this gear 12a-12d is the wheel 5a-5d to which the subject transmitter 2 transmitting the frame is integrated. Thus, this determination result is indicated as "TRUE".

Further, a second variation allowance range is set based on the angular position of the transmitter 2 when the transmitter 2 transmits the frame second time. The angular position of the transmitter 2 when the transmitter 2 transmits the frame second time is referred to as a second reception angle. As shown in FIG. 5B, the second variation allowance range is set to a range of 180 degrees centering on the second reception angle. That is, the second variation allowance range VAR is set to a range of +/−90 degrees of the second reception angle.

Furthermore, a new variation allowance range VAR is set by an overlapping range where the first variation allowance range and the second variation allowance range overlap with each other, as a third variation allowance range. For example, the third variation allowance range is set to a range where the edge number is from 12 to 48, as shown in FIG. 5B. In this way, the variation allowance range VAR is reduced to the third variation allowance range.

As shown in FIG. 5C, it is determined whether the edge number (or the tooth number) at the third reception timing of the frame is within the third variation allowance range. If the edge number (or the tooth number) of the gear 12a-12d at the third reception timing of the frame is not within the third variation allowance range, the wheel 5a-5d corresponding this gear 12a-12d is not the wheel 5a-5d to which the subject transmitter 2 transmitting the frame is integrated. Thus, this determination result is indicated as "FALSE".

In this case, when the edge number (or the tooth number) at the third reception timing of the frame is not within the third variation allowance range, even within the first variation allowance range, the determination result is indicated as "FALSE".

In this way, the microcomputer 33 determines to which wheel 5a-5d the subject transmitter 2 transmitting the frame is integrated, that is, the position of the subject transmitter 2 in the vehicle 1.

As shown in FIG. 6A, each time the microcomputer 33 receives a first frame including first identification (ID1) as the ID information, the microcomputer 33 detects the edge numbers (or the tooth numbers) of the gears 12a-12d. The microcomputer 33 stores the edge numbers (or the tooth numbers) for respective wheels 5a-5d, such as a front left wheel FL, a front right wheel FR, a rear left wheel RL and a rear right wheel RR.

Further, each time the microcomputer 33 receives the first frame, the microcomputer 33 determines whether each of the detected edge numbers (or the tooth numbers) is within the variation allowance range. When the edge number is not within the variation allowance range, the microcomputer 33 excludes the corresponding wheel 5a-5d from candidate wheels 5a-5d to which the subject transmitter 2 is integrated until one wheel 5a-5d remains.

The microcomputer 33 registers the wheel 5a-5d remaining last as the wheel 5a-5d to which the subject transmitter 2 transmitting the frame is integrated. With regard to the first frame including the ID1, as shown in FIG. 6A, the front right wheel FR and the rear right wheel RR are excluded first, and then the rear left wheel RL is excluded. Thus, the front left wheel FL, which remains last, is specified as the wheel to which the subject transmitter 2 is integrated, and is registered with the ID information.

The microcomputer 33 performs the similar determination to the second to fourth frames including the first to fourth identifications (ID2, ID3, ID4) as the ID information, as shown in FIGS. 6B to 6D. In this way, the wheel to which the subject transmitter 2 transmitting the frame is integrated is specified. Further, all of the wheels 5a-5d having the transmitters 2 can be specified.

When it has been determined that to which of the wheels 5a-5d each transmitter 2 is integrated in the manner described above, the microcomputer 33 stores a relationship between the ID information of each transmitter 2 and the position of the wheel to which the transmitter 2 is integrated, as the wheel position relationship.

The TPMS-ECU 3 receives the frame that is transmitted when the vehicle speed is at a predetermined speed, and stores the gear information at the reception timing of the frame. Further, when the vehicle speed decreases equal to or lower than a predetermined travel stop determination speed, such as 5 km/h, the TPMS-ECU 3 cancels the gear information stored so far. When the vehicle begins to travel again, the TPMS-ECU 3 newly performs the wheel position detection in the manner described above.

The TPMS-ECU 3 performs the tire pressure detection together with the wheel position detection. In particular, when the frame is transmitted at a predetermined timing from each transmitter 2, the frame is received by the TPMS-ECU 3. Thus, the TPMS-ECU 3 receives the frames for the four wheels 5a-5d. The TPMS-ECU 3 calculates the tire pressure, for each frame, based on the ID information and the tire pressure information stored in the frame. Further, the TPMS-ECU 3 identifies to which of the wheels 5a-5d each ID belongs to based on the wheel position relationship stored in the wheel position detection described above, and specifies the tire pressure of each wheel 5a-5d. In this way, the tire pressure of each wheel 5a-5d is detected.

Figure 7:
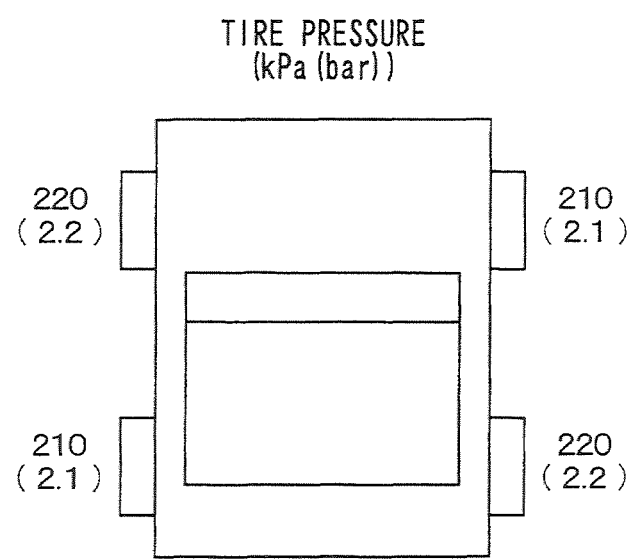
FIG. 7 is a schematic diagram illustrating an example of display of tire pressure of each wheel by a meter according to the first embodiment.

Based on the detection result of the tire pressure, the meter 4 displays the tire pressure of each of the wheels 5a-5d, for example, as shown in FIG. 7, to notify the driver of the tire pressure. When the tire pressure of any of the wheels 5a-5d is decreased, the value of the tire pressure of the wheel is lower than the other. Thus, the driver can recognize that the tire pressure is insufficient by the display of the meter 4. Further, when the tire pressure is decreased equal to or lower than the threshold, it may be warned to the driver by a warning indicator or a warning sound.

The wheel position detection described above is performed by the zero initiator method. Therefore, it takes a certain period of time to finish the wheel position detection. If the tire pressure is not indicated until the wheel position detection finishes, the driver does not know the tire pressure for the certain period of time after the vehicle 1 begins to travel. In the present embodiment, therefore, the TPMS-ECU 3 permits the meter 4 to indicate the tire pressure based on information previously stored until the wheel position detection finishes, while performing the wheel position detection described above. In particular, the TPMS-ECU 3 performs the following process to indicate the tire pressure until the wheel position detection finishes.

FIG. 8 is a flowchart illustrating the wheel position detection and tire pressure display process performed by the TPMS-ECU 3. The process shown in FIG. 8 is performed at a predetermined control interval when the ignition switch is on.

At 100, the TPMS-ECU 3 reads out previous wheel positions P(IDn) of the ID1 to ID4 of the transmitters 2 for the four wheels 5a-5d, which are detected in a previous wheel position detection, and sets FR, FL, RR, or RL for each of the previous wheel positions P(IDn). Namely, the TPMS-ECU 3 sets provisional wheel positions based on a previous wheel position relationship between the ID information of each frame and the position of the wheel to which the transmitter 2 transmitting the ID information is integrated, which was stored by the previous wheel position detection before a current wheel position detection. Here, IDn denotes any of the ID1 to ID4, and n denotes an index of 1 to 4.

When the TPMS-ECU 3 receive the frame (RF radio wave) at 105, the TPMS-ECU 3 checks the ID information stored in the received frame at 110 to authenticate whether the vehicle identification of the frame matches with the identification of the subject vehicle 1. When the vehicle identification is not authenticated at 110, the process returns to 105 and awaits a next frame. When the vehicle identification is authenticated at 110, the process proceeds to 115.

At 115, the TPMS-ECU 3 specifies which transmitter 2 the previous wheel position P(IDn) belonged to, based on the ID information stored in the received frame and the previous wheel position P(IDn) corresponding to the IDn. Further, the TPMS-ECU 3 reads the tire pressure information of the previous wheel position P(IDn), as received pressure data. Thereafter, at 120, the TPMS-ECU 3 determines whether the received pressure data of all of the four wheels has been received, that is, whether the received pressure data of all of the previous wheel positions P(ID1) to P(ID4) has been prepared. The TPMS-ECU 3 repeats the process from 105 to 120 until it is determined that the received pressure data for all of the four wheels has been received. When it is determined that the received pressure data of all of the four wheels has been received, the process proceeds to 125.

At 125, the TPMS-ECU 3 calculates the tire pressure of each previous wheel position P(IDn) based on the received pressure data of the four wheels. The TPMS-ECU 3 stores the tire pressure having the maximum value MAX(P(IDn)) as maximum pressure Pmax, and stores the tire pressure having the minimum value MIN(P(IDn)) as minimum pressure Pmin. At 130, the TPMS-ECU 3 calculates a difference between the maximum pressure Pmax and the minimum pressure Pmin (i.e., Pmax−Pmin) as a tire pressure difference. Further, the TPMS-ECU 3 determines whether the tire pressure difference is equal to or lower than a predetermined threshold ΔP. Therefore, the TPMS-ECU 3 can determine whether the tire pressure difference of the wheels 5a-5d is equal to or lower than the threshold ΔP.

When the tire pressure difference is equal to or lower than the threshold ΔP at 130, the process proceeds to 135. At 135, the TPMS-ECU 3 sets the wheel position of each IDn, which is to be specified by the current wheel position detection, to the previous wheel position P(IDn) once. At 140, the TPMS-ECU 3 permits the meter 4 to display the tire pressure of each previous wheel position P(IDn) calculated based on the received pressure data for each of the wheels 5a-5d. When the TPMS-ECU 3 determines that the tire pressure difference is greater than ΔP, the process proceeds to 145. At 145, the TPMS-ECU 3 retains a pending state where the wheel position of each IDn that is to be specified by the current wheel position detection is in an unspecified state.

That is, when the tire pressure difference is equal to or less than ΔP, the difference of the tire pressure among the four wheels 5a-5d is not noticeable, and it is not in a state where the tire pressure of a certain wheel is excessively low. Therefore, even if the tire pressure of each wheel 5a-5d is erroneously displayed, the driver will not feel uncomfortable. In such a case, therefore, the IDn that is to be specified in the current wheel position detection is provisionally set by the previous wheel position P(IDn) once, and the tire pressure is displayed based on the previous wheel position.

Therefore, the tire pressure can be notified to the driver from an earlier timing after the vehicle 1 begins to travel. Since it can be notified to the driver that there is no matter in the tire pressure immediately after the vehicle 1 begins to travel, the driver can have a feeling of safety in the driving from an early stage.

On the other hand, when the tire pressure difference is greater than the threshold ΔP, there is a possibility that the tire pressure of a certain wheel is excessively low. In such a case, if the tire pressure of the wheels 5a-5d is erroneously displayed, the driver may erroneously recognize the wheel whose tire pressure is excessively low. In this case, therefore, the TPMS-ECU 3 prevents the display of the tire pressure based on the previous wheel position, and awaits until the current wheel position detection finishes.

At 150, the TPMS-ECU 3 performs a wheel position detection process. In the wheel position detection process at 150, the wheel position is detected in the manner similar to the wheel position detection described above. When it is specified that to which of the wheels 5a-5d the transmitter 2 transmitting the frame is integrated, that is, when the position of the transmitter 2 transmitting the frame is specified, the TPMS-ECU 3 stores a current wheel position relationship between each IDn specified in the current wheel position detection and the wheel position. Also, the previous wheel position P(IDn) is renewed to the wheel position corresponding to the IDn specified in the current wheel position detection.

At 155, the TPMS-ECU 3 identifies which of the wheels 5a-5d each ID belongs to based on the current wheel position relationship, and identifies the tire pressure of each of the wheels 5a-5d. The TPMS-ECU 4 permits the meter 4 to display the tire pressure of each of the wheels 5a-5d to notify the driver of the tire pressure.

In this way, the TPMS-ECU 3 finishes the wheel position detection and tire pressure display process shown in FIG. 8. Thereafter, the TPMS-ECU 3 calculates the tire pressure based on the tire pressure information stored in the frame each time the TPMS-ECU 3 receives the frame from each transmitter 2, and renews the tire pressure of the wheel 5a-5d corresponding to the frame received based on the result of the current wheel position detection process. Accordingly, the tire pressure, which may vary, can be constantly renewed and indicated.

In the present embodiment described above, the result of the previous wheel position detection, which was performed last, is stored as the previous wheel positions. When the ignition switch is turned on and until the result of the current wheel position detection is obtained, the tire pressure of each wheel 5a-5d is displayed based on the previous wheel position. Therefore, the tire pressure can be notified to the driver from an earlier timing.

Further, the tire pressure using the previous wheel position is displayed only when the tire pressure difference is equal to or lower than the threshold ΔP. That is, in a case where the tire pressure of any of the wheels 5a-5d may be insufficient, the display of the tire pressure is prevented until the wheel position detection is properly finished. Therefore, it is less likely that the driver will erroneously recognize the wheel having the insufficient tire pressure.

In a case where the tire pressure is displayed using the previous wheel positions, if the positions of the wheels 5a-5d were changed due to the tire rotation, the tire pressure may be erroneously displayed. However, the display of the tire pressure using the previous wheel positions is performed only when the tire pressure difference is equal to or lower than the threshold ΔP, that is, when the tire pressure is substantially equal among the four wheels 5a-5d. Therefore, the tire pressure is displayed substantially properly.

After the tire pressure is displayed using the previous wheel positions, if the wheel positions detected subsequently by the current wheel position detection are different from the previous wheel positions, the previous wheel positions are renewed to the current wheel positions. Therefore, the tire pressure of the wheels 5a-5d can be displayed according to the actual wheel positions based on the result of the current wheel position detection process. In this case, a magnitude relationship of the tire pressure among the wheels 5a-5d may be changed. However, this change may not provide the driver with uncomfortable feeling.

That is, as the vehicle 1 travels, the temperature inside of each wheel 5a-5d increases, and the tire pressure of each wheel 5a-5d increases with the increase of the temperature. Because the rate of increase of the tire pressure is slightly different among the wheels 5a-5d, the magnitude relationship of the tire pressure may be changed among the wheels 5a-5d. Therefore, even if the magnitude relationship is changed from the state where the tire pressure is substantially equal among the wheels 5a-5d, the driver will not feel uncomfortable.

The display of the tire pressure using the previous wheel position is exemplarily employed to the case where the wheel position detection is performed based on the gear information provided by the detection signals of the wheel speed sensors 11a-11d described above. Namely, in a case where the four wheels 5a-5d have the same tire pressure, when the vehicle 1 continues to travel straight, the wheels 5a-5d have the same dynamic load diameter. Therefore, it will take time until the angular position of the transmitter 2 becomes outside of the variation allowance range. In such a case, if the tire pressure can be displayed from an early stage, the feeling of safety can be provided to the driver.

Second Embodiment

Figure 9A:
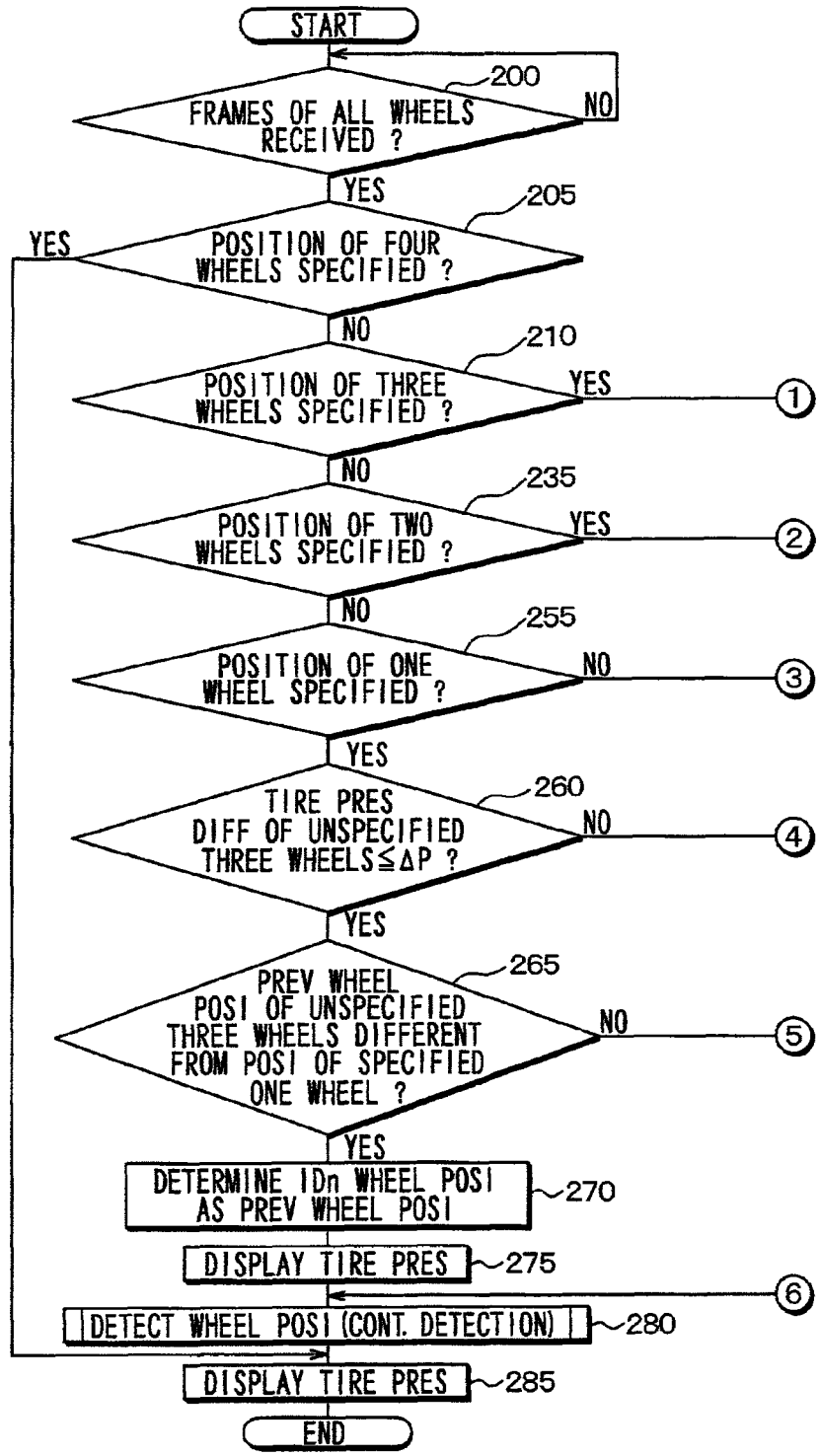

A second embodiment of the present disclosure will be described with reference to FIGS. 9A and 9B. The second embodiment is different from the first embodiment because the tire pressure is displayed by renewing the previous wheel position each time the position of the wheel to which the transmitter 2 is integrated to is specified. Other points of the second embodiment are similar to those of the first embodiment. Therefore, the point different from the first embodiment will be mainly described hereinafter.

In the first embodiment, the wheel position detection is performed based on the gear information obtained from the detection signals of the wheel speed sensors 11a-11d. In such a wheel position detection method, the wheel positions of the transmitters 2 are specified separately. Therefore, the wheel to which the transmitter 2 is integrated is specified one by one as shown in FIGS. 6A to 6D. In such a case, in a state where the wheel position has been specified only for one of or some of the wheels 5a-5d, for the wheel(s) that has been specified, the tire pressure can be displayed based on the specified wheel position. For the wheel(s) that has not been specified yet, the tire pressure can be displayed based on the previous wheel position when the tire pressure difference between the unspecified wheels is equal to or lower than a predetermined threshold, and when the specified wheel(s) is not included in the unspecified wheel(s).

For example, in a state where the wheel position of only one of the four wheels has been specified, when the tire pressure difference among the unspecified three wheels is small or substantially zero and the unspecified three wheels are different from the specified wheel, the tire pressure of the unspecified three wheels is displayed based on the previous wheel positions. In a state where the wheel position of only two of the four wheels has been specified, when the tire pressure difference between the unspecified two wheels is small or substantially zero and the unspecified two wheels are different from the specified two wheels, the tire pressure of the unspecified two wheels is displayed based on the previous wheel positions. Likewise, in a state where the wheel position of three of the four wheels has been specified, when the unspecified wheel is different from the specified three wheels, the tire pressure of the unspecified wheel is displayed based on the previous wheel position.

In the present embodiment, therefore, the wheel position detection and tire pressure display process is performed in the following manner. FIGS. 9A and 9B are flowcharts of the wheel position detection and tire pressure display process performed by the TPMS-ECU 3 of the present embodiment.

At 200, the TPMS-ECU 3 determines whether the frames (RF radio waves) of all of the four wheels have been received. The determination at 200 is performed in the similar manner to the determination process from 100 to 120 in FIG. 8.

The TPMS-ECU 3 awaits until the frames of all of the wheels are received. When the TPMS-ECU 3 receives the frames of all of the wheels, the process proceeds to 205. At 205, the TPMS-ECU 3 determines whether the wheel position of all of the four wheels has been specified. In particular, in a wheel position detection process at 280, which will be described later, the IDn whose wheel position has been specified is indicated as having been specified. Thus, at 205, the determination is made based on the result at 280. When the wheel position of all of the four wheels has not been specified at 205, the process proceeds to 210.

At 210, the TPMS-ECU 3 determines whether the wheel position of three wheels has been specified. When it is determined that the wheel position of the three wheels has been specified at 210, the process proceeds to 215. At 215, the TPMS-ECU 3 determines whether the previous wheel position of the unspecified wheel is different from the wheel positions of the specified three wheels.

When it is determined that the previous wheel position of the unspecified wheel is different from the wheel positions of the specified three wheels at 215, the process proceeds to 220. At 220, the TPMS-ECU 3 determines the wheel position of the IDn other than the specified wheels as the previous wheel position. At 225, the TPMS-ECU 3 permits the meter 4 to display the tire pressure of each of the wheels 5a-5d based on the specified wheels positions.

In this case, with regard to the specified three wheels, the tire pressure is calculated based on the tire pressure information included in the frame having the corresponding IDn, and the calculated tire pressure is displayed. With regard to the unspecified one wheel, the tire pressure is calculated based on the tire pressure information of the frame having the remaining IDn, that is, the IDn corresponding to the previous wheel position P(IDn), and the calculated tire pressure is displayed.

At 215, when it is determined that the previous wheel position of the unspecified wheel is not different from the wheel positions of the specified three wheels, that is, the previous wheel position of the unspecified wheel is one of the wheel positions of the specified three wheels, it is considered that the wheel positions ware changed due to the tire rotation or the like. Therefore, at 230, the TPMS-ECU 3 maintains the pending state where the wheel position of each IDn to be specified in the current wheel position is in an unspecified state.

When it is determined, at 210, that the wheel position of three wheels has not been specified, the TPMS-ECU 3 proceeds to 235. At 235, the TPMS-ECU 3 determines whether the wheel position of two of the four wheels has been specified. When it is determined, at 235, that the wheel position of the two wheels has been specified, the TPMS-ECU 3 determines whether the tire pressure difference of the unspecified two wheels is equal to or less than the threshold ΔP at 240.

When it is determined, at 240, that the tire pressure difference of the unspecified two wheels is equal to or less than the threshold ΔP, the TPMS-ECU 3 determines whether the previous wheel positions of the unspecified two wheels are different from the wheel positions of the specified wheels at 245. When it is determined, at 245, that the previous wheel positions of the unspecified two wheels are different from the wheel positions of the specified wheels, the process proceeds to 220. At 220, the TPMS-ECU 3 determines the wheel positions of the IDn other than the specified wheels as the previous wheel positions. Thereafter, at 225, the TPMS-ECU 3 permits the meter 4 to display the tire pressure of each of the wheels 5a-5d based on the specified wheel positions, in the similar manner described the above.

When it is determined, at 240, that the tire pressure difference of the unspecified two wheels is greater than the threshold ΔP at 240, there is a possibility that the tire pressure of one of the unspecified two wheels is insufficient. In this case, the process proceeds to 250.

When it is determined, at 245, that the previous wheel positions of the unspecified two wheels are not different from the wheel positions of the specified two wheels, such as, that the previous wheel position of at least one of the unspecified two wheels is the same as one of the wheel positions of the specified wheels, there is a possibility that the wheel positions have been changed due to the tire rotation or the like. Also in this case, the process proceeds to 250. At 250, the TPMS-ECU 3 maintains the pending state where the wheel position of each IDn to be specified in the current wheel position detection is in the unspecified state.

When it is determined, at 235, that the wheel position of two of the four wheels has not been specified, the process proceeds to 255. At 255, the TPMS-ECU 3 determines whether the wheel position of one of the four wheels has been specified. When it is determined, at 255, that the wheel position of the one of the four wheels has been specified, the TPMS-ECU 3 determines whether the tire pressure difference among the unspecified three wheels is equal to or less than the threshold ΔP at 260.

When it is determined, at 260, that the tire pressure difference is equal to or less than the threshold ΔP, the TPMS-ECU 3 determines whether the previous wheel positions of the unspecified three wheels is different from the wheel position of the specified wheel at 265. When it is determined, at 265, that the previous wheel positions of the unspecified three wheels are different from the wheel position of the specified wheel, the TPMS-ECU 3 determines the wheel positions of the IDn other than the specified wheel as the previous wheel positions at 270.

At 275, the TPMS-ECU 3 permits the meter 4 to display the tire pressure of each of the wheels 5a-5d based on the specified wheel positions, similar to the manner of 225.

When it is determined, at 260, that the tire pressure different is greater than the threshold ΔP at 260, there is a possibility that the tire pressure of any of the unspecified wheels is insufficient. In this case, the process proceeds to 250. Also, when it is determined, at 265, that the previous wheel positions of the unspecified three wheels are not different from the wheel position of the specified wheel, there is a possibility that the wheel positions were changed due to the tire rotation or the like. Also in this case, the process proceeds to 250. At 250, the TPMS-ECU 3 maintains the pending state where the wheel position of each IDn to be specified in the current wheel position detection is in an unspecified state.

Thereafter, at 280, the TPMS-ECU 3 performs the wheel position detection process. If the TPMS-ECU 3 has been already performing the wheel position detection process, the TPMS-ECU 3 continues the wheel position detection process.

The wheel position detection process is performed in the manner similar to that described above. In the wheel position detection process, each time the position of each frame, that is, which wheel the frame belongs to is specified, the TPMS-ECU 3 stores a relationship between the specified IDn and the wheel position, such that the IDn whose position has been specified can be identified. Also, the previous wheel position P(IDn) is renewed to the IDn specified in the current wheel position detection.

At 285, the TPMS-ECU 3 specifies to which wheel each ID belongs to based on the relationship between the ID information of each frame and the wheel position of the transmitter 2 transmitting the frame, which is stored in the current wheel position detection, and specifies the tire pressure of each of the wheels 5a-5d. Based on this, the TPMS-ECU 3 permits the meter 4 to display the tire pressure of each of the wheels 5a-5d to notify the driver of the tire pressure.

As described above, even in a state where the wheel position has not been specified for all of the four wheels, with regard to the wheel whose position has been specified, the tire pressure is displayed based on the specified wheel position. Therefore, the display of the tire pressure is renewed to accurate tire pressure each time the wheel position is specified. Accordingly, accurate tire pressure is displayed from an earlier timing.

Although the tire pressure is displayed using the previous wheel position, the wheel position detection process is performed simultaneously with the display of the tire pressure. Therefore, in case of a flat tire, the tire pressure can be displayed based on the accurate wheel positions.

Third Embodiment

A third embodiment of the present disclosure will be described.

In the present embodiment, the tire pressure detecting apparatus performs a control considering a battery life of the transmitter 2, in addition to the second embodiment. Other operations are same as the second embodiment, and an operation different from the second embodiment will be mainly described.

The transmitter 2 integrated to the wheel 5a-5d is operated by electric power supplied from the battery. In the wheel position detection process, for example, a time-out control is performed such that a duration time is limited to a predetermined period of time, considering the battery life. After the predetermined period of time elapses in the wheel position detection, an operation mode is switched from the wheel position detection mode to a regular transmission mode for detection of tire pressure. In the regular transmission mode, an interval of transmitting the frame is greater than that in the wheel position detection mode for performing the wheel position detection.

When the rotation of the wheels 5a-5d is stopped over a time period where the tire rotation or the like may be performed, the operation mode is switched to the wheel position detection mode again to perform the wheel position detection.

When the time-out control is employed in the wheel position detection in which the wheel position is specified based on the frame transmitted from the transmitter 2, there is a possibility that the position of all of the wheels is not specified for the predetermined duration time. Even in such a case, when the position of one or two wheels has been specified, it is assumed that the wheel position was not changed due to the tire rotation and the tire pressure may be displayed based on the previous wheel positions after the predetermined duration time elapses, that is, after the time out.

For example, in a case where the wheel position of only one of the four wheels has been specified, when the tire pressure difference among the unspecified three wheels is greater than the threshold, the previous wheel positions cannot be used because of the reason as the tire pressure difference being small, as described in the second embodiment.

On the other hand, when the wheel position of the IDn that has been specified is same as the previous wheel position, it is assumed that the tire rotation wan not carried out. In this case, therefore, for the unspecified wheels, the tire pressure is displayed based on the previous wheel positions after the time-out.

In a case where the wheel position of only two of the four wheels has been specified, when the tire pressure difference between the unspecified two wheels is greater than the threshold, the previous wheel positions cannot be used because of the reason as the tire pressure difference being small. On the other hand, when the wheel position of the IDn that has been specified is same as the previous wheel position, it is assumed that the tire rotation was not carried out. In this case, therefore, the tire pressure of the unspecified wheel is displayed based on the previous wheel position after the time-out.

It is to be noted that, when the previous wheel position is used for the display of the tire pressure of the unspecified wheel, the tire pressure is displayed under assumption. Therefore, when the tire pressure is decreased in any of the wheels 5a-5d due to a flat tire or the like, the corresponding transmitter 2 may be switched to the wheel position detection mode, and the wheel position detection process may be performed again by the TPMS-ECU 3.

In this case, with regard to the wheel having a flat tire, the air reduces and a dynamic load diameter changes. Therefore, data of the gear position based on the detection signal of the wheel speed sensor 11a-11d largely changes. Accordingly, the position of the wheel having the flat tire can be recognized accurately in a relatively short time.

Other Embodiments

In the first embodiment, the wheel position detection is performed based on the gear information obtained from the detection signals of the wheel speed sensors 11a-11d. However, the display of the tire pressure using the previous wheel positions can be employed in any other wheel position detection methods.

For example, the display of the tire pressure using the previous wheel positions may be employed in a method in which a receiver measures a signal strength when receiving a frame from a transmitter having a dual-axis accelerometer, and the position of the transmitter, that is, to which wheel the transmitter is integrated is detected based on the frame and the signal strength, similar to a method described in the patent literature 1 (U.S. Pat. No. 7,010,968 B2).

Also, the display of the tire pressure using the previous wheel positions may be employed in a method where a RF antenna is disposed adjacent to each of the wheels, and the transmitter transmitting the frame having the largest signal strength is determined as the transmitter integrated to the wheel closest to the RF antenna, similar to a method described in the patent literature 2 (U.S. Pat. No. 6,018,993).

Further, the display of the tire pressure using the previous wheel positions may be employed in a method in which the wheel position is detected based on distribution of a RSSI value of the signal transmitted from a transmitter integrated to each wheel, similar to a method described in the patent literature 3 (U.S. Pat. No. 6,489,888 B1).

In the embodiments described above, the variation allowance range is changed each time the frame is received such that the variation allowance range is gradually reduced. However, the variation allowance range that is set centering on the tooth position is fixed. The variation allowance range that is set centering on the tooth position may be also changed. For example, the variation of the tooth position is likely to increase with an increase in vehicle speed. Therefore, in a case where the variation allowance range is increased with the increase in vehicle speed, the variation allowance range may be further accurately set. Also, accuracy of detecting the timing where the angular position of the acceleration sensor is at the predetermined angular position is likely to reduce with an increase in sampling interval of detecting the acceleration by the acceleration sensor 22. Therefore, the variation allowance range may be changed in accordance with the sampling interval. In such a case, the variation allowance range is further properly set. Since the transmitter 2 realizes the sampling interval and the like, the transmitter 2 may include data for determining the magnitude of the variation allowance range in the frame.

In the embodiment described above, when the wheel position is specified based on the gear information, the variation allowance range is set based on the tooth position, and the wheel position is specified by determining whether the tooth position is within the variation allowance range. Further, the variation allowance range is reduced by setting the overlapping range where the previous variation allowance range and the subsequent variation allowance range overlap with each other as the new variation allowance range. In this case, the wheel position is specified in the shorter time. However, even if the variation allowance range is not reduced, since the accurate gear position is acquired as described above, the wheel position is specified further accurately in a further shorter time. Also in a case where the wheel position is specified based on a standard variation of the tooth position at the reception timings of the plural frames, the similar advantageous effects may be achieved by shifting the transmission angular position each time the frame is transmitted.

In the embodiment described above, the angular position right above the wheel center axis is defined as the zero position, as the reference position. However, the reference position may be set to any position in a circumferential direction of the wheel 5a-5d.

In the embodiments described above, the TPMS-ECU 3 acquires the gear information from the brake ECU 10. However, the TPMS-ECU 3 may acquire the edge number or the tooth number as the gear information in any other way. For example, the TPMS-ECU 3 may acquire the edge number or the tooth number as the gear information from another ECU. As another example, the TPMS-ECU 30 may receive the detection signals from the wheel speed sensors 11a-11d, and obtain the edge number or the tooth number of each gear 12a-12d based on the detection signal obtained.

In the embodiments described above, the TPMS-ECU 3 and the brake ECU 10 are separate. As another example, the TPMS-ECU 3 and the brake ECU 10 may be integrated into a single ECU. That is, the TPMS-ECU 3 and the brake ECU 10 may be provided by a single ECU. In such a case, the ECU may directly receive the detection signals of the wheel speed sensors 11a-11d, and obtains the edge number or the tooth number of each gear 12a-12d by calculation based on the detection signal received at a predetermined interval.

In the embodiment described above, the wheel position detection device is exemplarily employed to the vehicle 1 having four wheels 5a-5d. The wheel position detection device may be employed to a vehicle having wheels other than four.

In the present disclosure, the wheel speed sensors 11a-11d detect at least the passage of the teeth of the gears 12a-12d rotated in association with the wheels 5a-5d. The gears 12a-12d may have a structure in which teeth have conductive outer surfaces and intermediate portions between the teeth have a magnetic resistance different from the outer surfaces of the teeth. Namely, the gears 12a-12d may have any structure. For example, the gears 12a-12d may be a general gear having projections and recesses on an outer surface of the gear. The projections have conductivity, and the recesses are spaces providing non-conductive portions. As another example, the gears 12a-12d may be a rotor switch whose outer surface includes conductive portions and non-conductive insulation portions, for example, as described in JP-A-10-048233.

The indication of the tire pressure may not be limited to the display by the meter 4 shown in FIG. 7. The tire pressure may be indicated in any ways, other than the display by the meter 4.

While only the selected exemplary embodiments have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiments according to the present disclosure is provided for illustration only, and not for the purpose of limiting the disclosure as defined by the appended claims and their equivalents.

What is claimed is:

1. A tire pressure detecting apparatus for a vehicle having a body and a plurality of wheels with tires, the tire pressure detecting apparatus comprising:
   a transmitter being integrated to each of the plurality of wheels, the transmitter including a first control unit, the first control unit detecting tire pressure of the wheel, the first control unit generating and transmitting a frame including identification information specific to the transmitter and tire pressure information regarding the tire pressure detected; and
   a receiver being integrated to the body, the receiver including a second control unit, the second control unit receiving the frame transmitted from the transmitter through an antenna, the second control unit performing a wheel position detection to specify a wheel position indicating which of the wheels the transmitter transmitting the frame is integrated to and to store a relationship between the wheel position specified and the identification information of the transmitter, as a wheel position relationship, the second control unit permitting an indicator to indicate tire pressure provided by the tire pressure information included in the frame while specifying the wheel, based on the wheel position relationship stored in the wheel position detection, wherein
   until a current wheel position detection finishes, when a difference of tire pressure of the wheels provided by the tire pressure information stored in the frames is equal to or less than a threshold, the second control unit permits the indicator to indicate the tire pressure based on a previous wheel position, as a provisional wheel position, that is provided by a previous wheel position relationship stored in a previous wheel position detection.

2. The tire pressure detecting apparatus according to claim 1, wherein
   the transmitter includes an acceleration sensor that outputs a detection signal according to an acceleration containing a gravitational acceleration component that varies with rotation of the wheel to which the transmitter is integrated,
   the first control unit detects an angular position of the transmitter relative to a reference position, based on the gravitational acceleration component provided by the detection signal of the acceleration sensor, the reference position being set at any position in a circumferential direction of the wheel, and
   the first control unit transmits the frame at a predetermined timing where the transmitter is at a transmission angular position,
   the tire pressure detecting apparatus further comprising:
   a wheel speed sensor being provided for each of the wheels to detect a tooth of a gear that rotates in association with the wheel, the gear including conductive portions as teeth and intermediate portions between the conductive potions, the intermediate portions having a magnetic resistance different from the conductive portions, wherein
   the second control unit acquires gear information indicating a tooth position of the gear based on a detection signal of the wheel speed sensor,
   in the wheel position detection, the second control unit sets a variation allowance range based on the tooth position at a reception timing of the frame and determines whether the tooth position at a subsequent reception timing of the frame is within the variation allowance range, and when the tooth position of the gear at the subsequent reception timing is not within the variation allowance range, the second control unit excludes the wheel corresponding to the gear from a candidate wheel until one wheel remains, and specifies a remaining wheel as the wheel to which the transmitter is integrated.

3. The tire pressure detecting apparatus according to claim 2, wherein
   in a state where the wheel position is specified for a part of the transmitters and the wheel position is not specified for a remaining transmitter, the second control unit permits the indicator to indicate the tire pressure of the wheel associated with the remaining transmitter based on the previous wheel position as the provisional wheel position, when the difference of the tire pressure is equal to or less than the threshold.

4. The tire pressure detecting apparatus according to claim 3, wherein the transmitter has a wheel position detection mode in which the frame is transmitted at the predetermined timing where the transmitter is at the transmission angular position and a regular transmission mode in which the frame is transmitted at an interval longer than frame transmission in the wheel position detection mode, the transmitter switches from the wheel position detection mode to the regular transmission mode when the wheel position detection mode has continued for a predetermined time period, and in the wheel position detection mode, when the predetermined time period has elapsed in a state where the wheel position has been specified for a part of the transmitters and the wheel position has not been specified for a remaining transmitter, the second control unit determines whether the wheel position of the part of the transmitters specified by the current wheel position detection is same as the previous wheel position, and when the wheel position of the part of the transmitters specified by the current wheel position detection is same as the previous wheel position, the second control unit permits the indicator to indicate the tire pressure of the wheel associated with the remaining transmitter based on the previous wheel position as the provisional wheel position.

* * * * *